Jan. 25, 1966     M. A. FERGUSON     3,231,782

ELECTRICAL STOCK REMOVAL METHOD AND APPARATUS

Filed Aug. 30, 1960

| | | | | | |
|---|---|---|---|---|---|
| TUBE 40 | ON | OFF | ON | OFF | ON |
| TUBE 18 | OFF | ON | OFF | ON | OFF |
| TUBE 28 | ON | OFF | ON | OFF | ON |

INVENTOR.
Millard A. Ferguson
BY
Hugh L. Fisher
ATTORNEY

3,231,782
ELECTRICAL STOCK REMOVAL METHOD
AND APPARATUS
Millard A. Ferguson, Utica, Mich., assignor to General
Motors Corporation, Detroit, Mich., a corporation of
Delaware
Filed Aug. 30, 1960, Ser. No. 52,954
10 Claims. (Cl. 315—162)

This invention relates to improvements in method and apparatus electrically removing stock from a conductive workpiece.

Most conventional electrical stock removal apparatuses include provision for maintaining a predetermined gap between conductive cutting tool and workpiece electrodes. Power is supplied to the gap through which a dielectric fluid flows and when the voltage across the gap is sufficient to produce an ionized path through the dielectric fluid, a stock removing discharge occurs. In the past, a capacitor or the equivalent has been connected across the gap and then is charged until the gap breaks down whereupon this discharge will occur. Often the capacitor is charged by a pulse source so that usually several pulses are required to charge the capacitor. Once a discharge occurs, an interval must elapse adequate to permit the gap to deionize before the capacitor can be recharged; otherwise, current flow would continue. From this it can be seen that when several pulses are required to charge the capacitor (the number can vary with each discharge), it is very difficult to control finish and overcut and in addition machining time is lost.

Accordingly, the invention contemplates a method and apparatus utilizing a power supply wherein a stock removal discharge can be produced with each pulse supplied by a source. Moreover, by the invention, an electrical stock removal discharge is not only produced with each pulse but directly by the source and without a capacitor.

More specifically stated, the invention seeks to provide a power supply that maintains a predetermined voltage across the gap between stock removal discharges thereby enabling each pulse to produce a stock removal discharge while still permitting gap deionization to occur between discharges. The coordination of the pulses with the maintenance of the predetermined gap voltage is, according to the invention, accomplished by a novel switching arrangement in turn controlled by a pulse forming network.

Figure 1:
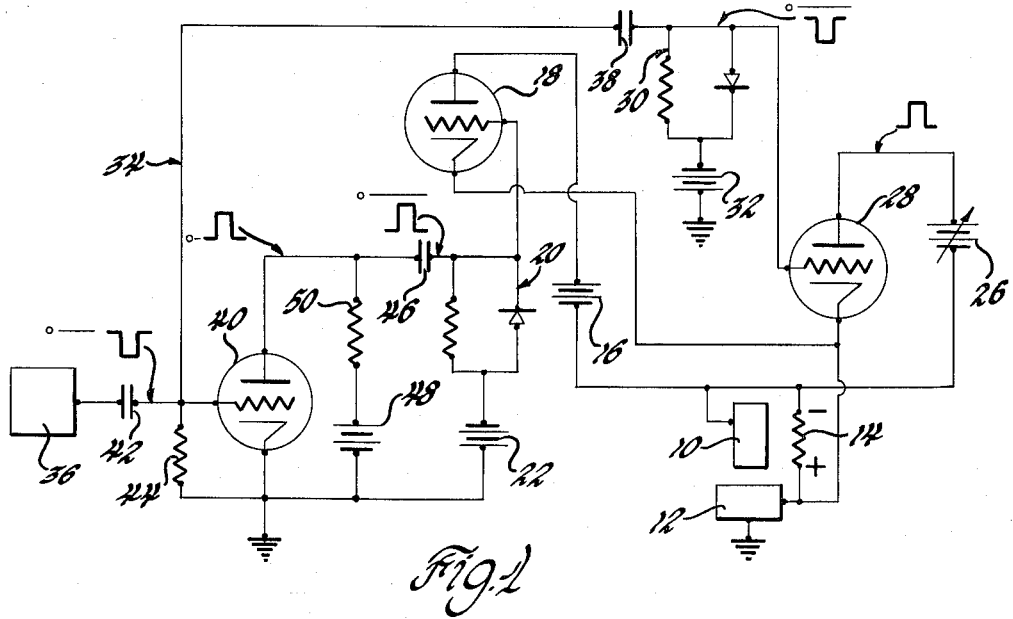
Figure 2:
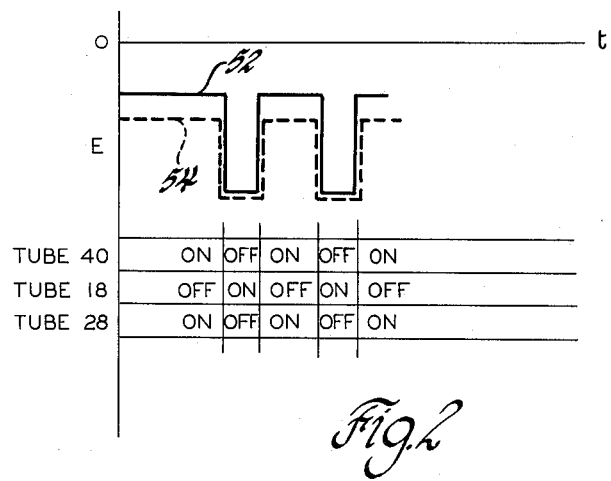

The foregoing and other objects and advantages of the invention will become apparent from the following description and from the accompanying drawings in which:

FIGURE 1 is a diagram of the circuitry employed in carrying out the invention; and FIGURE 2 is a graphical representation of the gap voltages obtained with the FIGURE 1 circuitry.

Referring first to FIGURE 1 of the drawings, the numerals 10 and 12 designate, respectively, a cutting electrode and a workpiece electrode across which is connected a load resistor 14. The apparatus for maneuvering the electrodes 10 and 12 relative to each other (not shown) may be of any well-known construction. This process commonly known as "Electric Discharge Machining," not only requires relatively accurate gap spacing, but that a dielectric fluid flow through the gap so that when power is supplied to the gap it will become ionized. Then electrical stock removal discharges will occur in the customary fashion.

The power supply for effecting these stock removal discharges in this embodiment utilizes a power source such as battery 16 arranged in series with the gap. Also in series with the gap and arranged to connect and disconnect the power source thereto is a switching proviso that in the preferred embodiment is accomplished electronically by a triode 18 hereinafter referred to as a power control tube. As will be understood by those versed in the art, a suitable semiconductor could be employed in place of the power control tube 18 or this could be accomplished through mechanical and/or electrical relays. The power control tube 18 is grid controlled, the bias being determined by a positive clamping circuit shown generally at 20. The reference level for the clamping circuit 20 is determined by a negative voltage source, in this instance, a battery 22. The mode of grid control will become apparent as the description proceeds.

Also connected across the gap and likewise in series therewith is a variable voltage source denoted generally at 26. The voltage source 26 is connected across the gap somewhat in the way of the battery 16, i.e., electronically by a triode 28, hereinafter referred to as a voltage control tube. As with the power control tube 18, the voltage control tube 28 performs a switching function, which may be accomplished in other ways, e.g., mechanically or with an appropriate semiconductor, each in any known way. The voltage control tube 28 is grid controlled by, in this instance, the bias determined by a negative clamping circuit depicted at 30, the reference level for which is established by a battery 32.

The triggering on and off of the two tubes 18 and 28 is accomplished by a control circuit designated generally at 34 in the drawing. As part of the control circuit 34, a pulse forming network viewed at 36 is included and this may be some type of pulse generator, such as a multivibrator, the pulses being preferably of a square wave shape and time spaced to suit the application of the apparatus. The pulse forming network 36 is both coupled to the voltage control tube 28 through a capacitor 38 and to a driver tube 40 for the power tube 18 through a capacitor 42. The driver tube 40 in this case is preferably a grid controlled triode and functions as an amplifier increasing the signal from the pulse forming network 36 to a level than can be utilized for operating the power control tube 18. The cutoff point for the driver tube 40 is established by a bias resistor 44 interconnected between the grid and the cathode of the tube 40. The plate circuit of the driver tube 40 is coupled to the grid of the power tube 18 through a capacitor 46 and is supplied voltage from a battery 48 through a load resistor 50.

With the foregoing description of the details of the FIGURE 1 circuitry in mind, the operation will now be described. Considering first the occurrences when the pulse from the network 36 is on and going negative as indicated in FIGURE 1, this will cause, first, the grid of the voltage control tube 28 to go negative thus biasing the tube beyond the cutoff point. It should be mentioned here that throughout the diagram the voltage shapes and their relative position to a zero reference are portrayed to facilitate an understanding of the events that do occur. With the voltage control tube 28 cut off, the voltage of the variable voltage source 26 is not applied to the gap. Next, and with the input pulse still on, the driver tube 40 will be cut off by the negative going signal to the grid thereof. As a consequence, and because of the phase inversion, the signal applied to the grid of the power tube 18 will be positive going and cause the power tube 18 to become conductive. This conduction connects the power source 16 directly across the gap and the charge will build up until the gap is ionized at which time a stock removing discharge will occur and remove particles of metal from the workpiece 12, this phenomena occurring in the conventional fashion.

Now, when the pulse from the network 36 goes off, the driver tube 40 will commence to conduct inasmuch as the grid will become more positive. Accordingly, the voltage applied to the grid of the power tube 18 will become more negative causing the power tube 18 to become nonconductive, and interrupt or switch off the connection between the gap and the power source 16. Meanwhile, the off signal will cause the grid of the voltage control tube 28 to become more positive, triggering this tube on, so that the voltage from the source 26 will be applied to the gap. This voltage will be of a magnitude that will not interfere with the deionization of the gap, but will increase the level of the gap voltage, and therefore, a result will be obtained similar to that depicted in FIGURE 2, for normally without the voltage source 26 and after a discharge, assuming the gap has deionized and ceased conducting, the voltage across the gap could and frequently does fall to, for instance, a minus two or three volts as shown by the solid line 52. But because the gap when deionized provides a high impedance path to the flow of current, this negative two or three volts potential can be increased sufficiently, e.g., as illustrated by the broken line 54, so that when the voltage of the power source 16 is applied for some predetermined time interval, assurance can be had that a discharge will take place, this taking place through a low impedance path once the gap is ionized. The effect, then, is to change this negative two or three volts to perhaps a negative twenty volts, which, if the gap spacing and other influencing factors are properly established, could be compared with a minus eighty volts at which a discharge is to occur. Consequently, the gap voltage would only have to be increased sixty volts to produce a discharge as compared with the usual or customary requirement of almost eighty volts.

From the foregoing, it can be seen that by maintaining the gap voltage at some minimum level, assuming proper adjustment of the parameters of the circuitry, a stock removal discharge can be achieved during each cycle, i.e., when the input pulse from the network 36 goes on. Consequently, when one is assured of a discharge each cycle, the finish on the workpiece and the amount of overcut can be more easily controlled and predicted.

The invention is to be limited only by the following claims:

1. In electrical stock removal apparatus, the combination of conductive tool and workpiece electrodes spaced apart so as to form a gap therebetween, means supplying a voltage of a predetermined polarity to the gap at a certain frequency so as to produce stock removal discharges across the gap, and means maintaining the voltage across the gap between discharges at a predetermined minimum level just below the voltage required to maintain ionization of the gap and of the same predetermined polarity so that a minimum increase in the gap voltage is required to produce a discharge.

2. In electrical stock removal apparatus, the combination of conductive tool and workpiece electrodes spaced apart so as to form a gap therebetween, means including a first voltage source for supplying time spaced pulses of a predetermined polarity and of a certain voltage to the gap so as to cause stock removal discharges across the gap, and means including a second voltage source for maintaining the voltage across the gap at a predetermined minimum level and of the same predetermined polarity so that a discharge occurs with each pulse, the predetermined level being just below the voltage required to maintain ionization of the gap so that a minimum increase in the gap voltage is required to produce a discharge.

3. In electrical stock removal apparatus, the combination of conductive tool and workpiece electrodes spaced apart so as to form a gap therebetween, plural sources of voltage, means connecting each voltage source across the gap, and means controlling the connecting means so that alternately at a certain frequency first one voltage source of a predetermined polarity is connected across the gap so as to produce an electrical stock removal discharge thereacross and then another is connected across the gap so as to maintain the voltage level across the gap at a predetermined minimum and of the same predetermined polarity between electrical stock removal discharges, the predetermined minimum voltage level being just below the voltage required to maintain ionization of the gap so that a minimum increase in the gap voltage is required to produce a discharge.

4. In electrical stock removal appartus, the combination of conductive tool and workpiece electrodes spaced apart so as to form a gap therebetween, a power source, first switch means connecting the power source across the gap so as to apply a voltage of a predetermined polarity thereto and thereby effect time spaced electrical stock removal discharges across the gap, a voltage source, second switch means connecting the voltage across the gap so as to maintain gap voltage of the same predetermined polarity at a predetermined level, and control means coordinating the operation of the first and second switch means at a certain frequency so that gap is maintained at the predetermined level between discharges, the predetermined level being just below the voltage required to maintain ionization of the gap so that a minimum increase in the gap voltage is required to produce a discharge.

5. In electrical stock removal apparatus, the combination of conductive tool and workpiece electrodes spaced apart so as to form a gap therebetween, a power source, first switch means connecting the power source across the gap so as to apply a voltage of a predtermined polarity thereto and thereby effect time spaced electrical stock removal discharges across the gap, a variable voltage source, second switch means connecting the voltage source across the gap so as to maintain gap voltage of the same predetermined polarity at a predetermined level, and control means coordinating the operation of the first and second switch means so that time spaced pulses at a certain frequency are supplied to the gap by the source and so that the gap voltage is maintained at the predetermined level between each pulse thereby producting an electrical stock removal discharge across the gap with each pulse, the predetermined level being just below the voltage required to maintain ionization of the gap so that a minimum increase in the gap voltage is required to produce a discharge.

6. In electrical stock removal apparatus, the combination of conductive tool and workpiece electrodes spaced apart so as to form a gap therebetween, a power source, first switch means connecting the power source across the gap so as to apply a voltage of a predetermined polarity thereto and thereby effect time spaced electrical stock removal discharges across the gap, a voltage source, second switch means connecting the voltage source across the gap so as to maintain the gap voltage of the same predetermined polarity at a predetermined level, and control means alternately operating the first and the second switch means at a certain frequency so as to initially connect the gap to the power source and then to the voltage source thereby maintaining gap voltage at the predetermined level determined by the voltage source between each stock removal discharge produced by the power source, the predetermined level being just below the voltage required to maintain ionization of the gap so that a minimum increase in the gap voltage is required to produce a discharge.

7. In electrical stock removal apparatus, the combination of conductive tool and workpiece electrodes spaced apart so as to form a gap therebetween, a power source, a first switch connecting the power source across the gap so as to apply a voltage of a predetermined polarity thereto and thereby effect electrical stock removal discharges across the gap, a voltage source, a second switch connecting the voltage source across the gap so as to maintain the gap voltage at a predetermined level, a control circuit for the switches, the control circuit including a pulse forming network so arranged as to alternately trigger the first and second switches at a certain frequency and thereby connect first the power source to the gap and then the voltage source, the voltage source maintaining the gap voltages between discharges at a predetermined level just below the voltage required to maintain ionization of the gap so that a minimum increase in the gap voltage is required to produce a discharge.

8. In electrical stock removal apparatus, the combination of conductive tool and workpiece electrodes spaced apart so as to form a gap therebetween, a power source, a first electronic switch device in series with the source of power and the gap, a variable voltage source, a second electronic switch device also in series with the voltage source and the gap, a control circuit for the first and the second electronic switch devices, the control circuit including a pulse forming network so arranged as to alternately render the first and second electronic switch devices conductive at a certain frequency and thereby connect first the power source to the gap so as to apply a voltage of a predetermined polarity thereto for effecting electrical stock removal discharges across the gap and then the voltage source so as to maintain the voltage across the gap between discharges of the same predetermined polarity and at a predetermined level just below the voltage required to maintain ionization of the gap thereby requiring a minimum increase in gap voltage to produce a discharge thus facilitating a discharge each time the power source is connected across the gap.

9. In electrical stock removal apparatus, the combination of conductive tool and workpiece electrodes spaced apart so as to form a gap therebetween, plural sources of voltage, a series of electronic switch devices each arranged to connect one of the voltage sources across the gap so as to apply voltages of the same predetermined polarity thereto, and a control circuit for the electronic switch devices, the control circuit including a pulse forming network so arranged as to alternately render the electronic switch devices conductive at a certain frequency and thereby cause one and then another of the voltage sources to be connected across the gap thereby effecting electrical stock removal discharges across the gap between which discharges gap voltage is maintained at a predetermined level, the predetermined level being just below the voltage required to maintain ionization of the gap so that a minimum increase in gap voltage is required to produce a discharge.

10. In electrical stock removal apparatus, the combination of conductive tool and workpiece electrodes spaced apart so as to form a gap therebetween, power and voltage sources, a pair of grid controlled discharge tubes for respectively connecting the power and voltage sources across the gap so as to apply voltages of the same predetermined polarity thereto, a control circuit for the discharge tubes, the control circuit including a pulse forming network connected to the grids of each of the discharge tubes so as to render the discharge tubes alternately conductive at a certain frequency thereby causing the gap to be connected first to the power source so as to effect an electrical stock removal discharge and then to the voltage source so as to maintain the gap voltage between the discharges at a predetermined level just below the voltage required to maintain ionization of the gap thereby requiring a minimum increase in gap voltage to produce a discharge.

References Cited by the Examiner
UNITED STATES PATENTS

| | | | |
|---|---|---|---|
| 2,405,843 | 8/1946 | Moe | 328—59 |
| 2,701,306 | 2/1955 | Bess | 328—59 X |
| 2,804,575 | 8/1957 | Matulaitis | 315—163 |
| 2,891,137 | 6/1959 | Graell | 219—69 |
| 2,951,930 | 9/1960 | McKechnie | 219—69 |

GEORGE N. WESTBY, *Primary Examiner.*

RALPH G. NILSON, ROBERT SEGAL, *Examiners.*